Patented Sept. 14, 1954

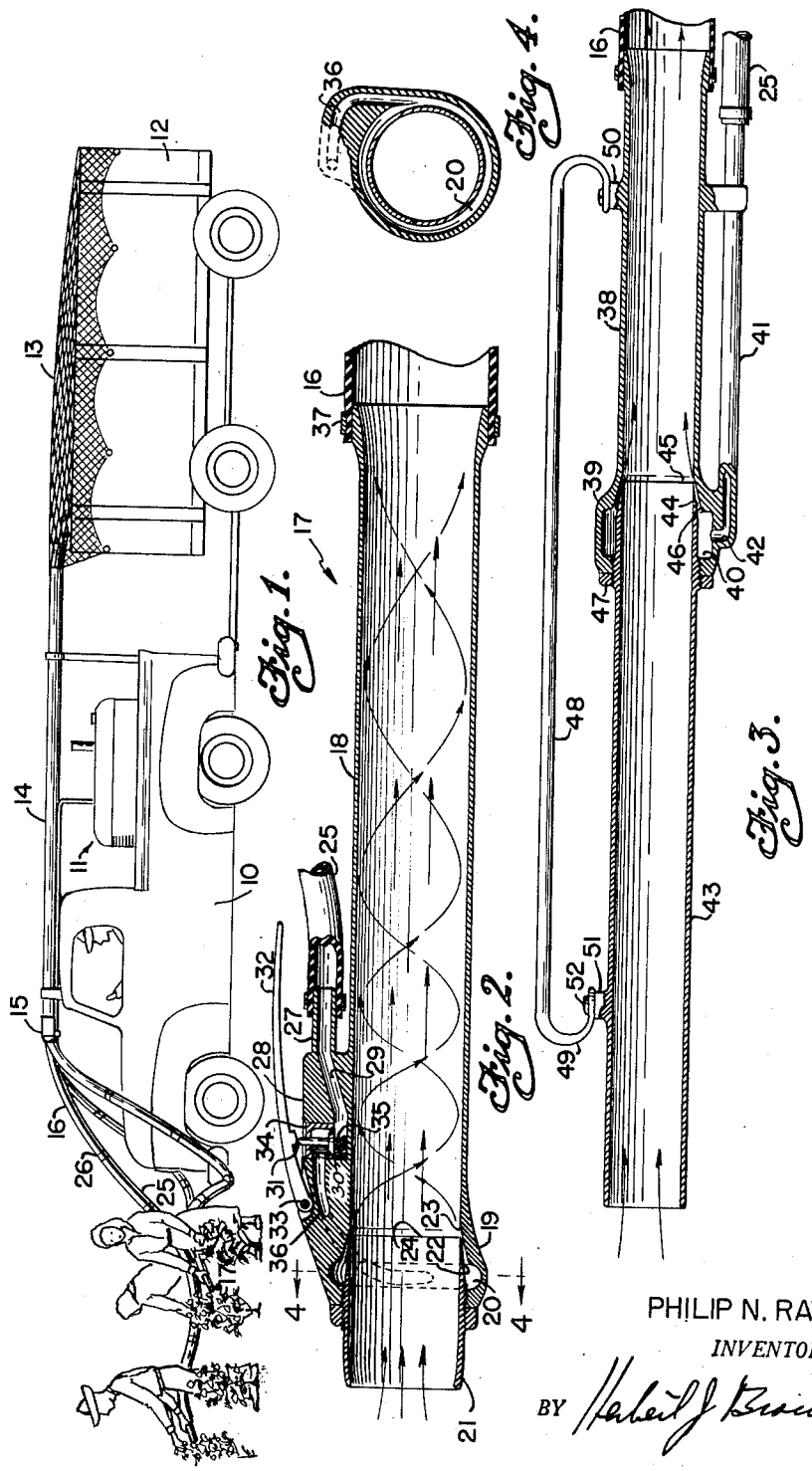

2,688,835

UNITED STATES PATENT OFFICE 2,688,835

PNEUMATIC COTTON-PICKING NOZZLE

Philip N. Rawson, Fort Worth, Tex.

Application July 25, 1952, Serial No. 300,919

1 Claim. (Cl. 56—32)

This invention relates to improvements in apparatus for picking cotton.

An object to the invention is to provide an effective means for selectively picking cotton from cotton plants without picking the bolls, leaves or other foreign matter, and without damaging the cotton plants.

Another object of the invention is to provide, in cotton picking apparatus, a nozzle construction capable of unobstructed flow of cotton therethrough, yet one which is efficient in its operation.

A further object is to provide a light weight construction for the described purpose and whereby the operator will not tire quickly when using the same.

In the accompanying drawings:

Figure 1 is a side elevation of cotton picking apparatus embodying the features of the invention.

Figure 2 is an enlarged central longitudinal sectional view of a preferred nozzle employed in the invention.

Figure 3 is a longitudinal sectional view of a nozzle employed in a modified form of the invention, and Figure 4 is a transverse section taken on line 4—4 of Figure 2.

An objection to many cotton pickers now in use is that they gather the bolls, leaves and stems which results in the down grading of the cotton and the destruction of the plants. Since the cotton in any one field does not mature all at one time, it follows that the cotton should be picked several times allowing the unopened bolls to remain on the plants until they are open. In order to accomplish the latter it is necessary to have an effective means for pulling the cotton from the bolls without damaging the plants.

The form of the invention shown is generally comprised of a source of air under pressure, an effective suction nozzle for selectively picking cotton from cotton bolls, and means of conveying cotton thus picked to a trailer, truck, or the like.

The exemplary form of the invention shown includes a primary mover 10 for transporting the apparatus to be described along the rows of cotton plants in the field. The primary mover, such as a truck or the like, carries an air compressor 11 and pulls a trailer 12 which may be covered with a net 13 for retaining the cotton until the same is unloaded. In the form of the invention shown, a conveyor pipe 14 is mounted above and along the length of the truck 10 and is provided at its forward end with a fitting 15 for connection with a multiple of connecting hoses 16. Nozzles 17, illustrated in Figure 2, are connected with the free ends of connecting hoses 16 and are of a size and shape to be handled by the cotton pickers in the manner illustrated in Figure 1. The nozzle 17 referred to includes tubular body 18 having a circular casing 19 around the forward end thereof which has an annular chamber 20 therein. A tubular nose piece 21 is threadedly engaged in the forward end of the body 18 and the received end of which is inwardly tapered on its outer surface as at 22 to form a thin edge at its rearward end. The rearward surface of the annular chamber 20 is also tapered as at 23 so as to provide a rearwardly directed annular port 24, hereinafter referred to.

Air under pressure is applied to each annular chamber 20 by means of an air pressure hose 25 connected with the compressor 11 and which air pressure hose is arranged along side of each connecting hose 16 by suitable means, such as rings 26 as shown in Figure 1. The remaining end of each air pressure hose 25 is connected with a tubular extension 27 integral with a boss 28 adjacent to and forming a part of the circular casing 19. The passage 29 of the tubular extension 27 is connected with a control valve 30 mounted in the boss 28 and having the stem 31 thereof outwardly directed for contact with a control lever 32 hingedly mounted in the boss 28 by means of a pin 33. A stem type valve seat 34 is arranged to prevent passage of air therethrough except when the control lever 32 is operated; a spring 35 is mounted within the passage 29 for carrying out the last referred to operation. A connecting port 36 communicates the valve seat 34 with the annular chamber 20 and is arranged so that air entering the latter is at a tangent with respect to the periphery of the annular chamber. The last referred to feature is shown in detail in Figure 4. It will be noted in Figure 2 that the distance from the annular tapered port 24 to the rear end of tubular 18 is equal to at least 4 inside diameters of said body. The rear end of the body 18 is secured to its connecting hose 16 by means of a ring 37.

The modified form of nozzle illustrated in Figure 3 includes a tubular body 38 having the rear end thereof secured to a connecting hose 16 as previously referred to, and is also provided with a circular casing 39 on its forward end and includes an annular chamber 40 therein. The chamber 40 is connected to an air pressure hose, such as 25, by means of a connecting tube 41. The modified form of the invention does not include a tangently directed port, such as 36, but may be perpendicular, as at 42, to the circumference of the annular chamber 40. Similarly, within the intention of the invention, either annular chamber 20 or 40 may have its air supply tangentially or perpendicularly directed. The tubular nose 43 of modified form of the invention is considerably longer than the one, 21, previously described, and includes a tapered outer surface 44 on its rearward end so as to provide a rearwardly directed annular tapered port 45 when secured in the forward end of the tubular body 38. The latter is also provided with a tapered surface 46 for carrying out the last referred to port construction. The nose 43 is screwed on the casing 39 and is secured by means of a jam nut 47. If desired, an elongated handle 48 having endwardly formed ends 49 may be secured to bosses 50 and 51 on the tubular body 38 and nose piece 43 by means of screws 52 for convenience in handling the described nozzle assembly.

When the first described form of nozzle is employed for picking cotton, the nose piece 21 is placed against the cotton extending from the open bolls, and the lever 32 is pressed, causing air from the air pressure hose 25 to enter the annular chamber 20, and pass rearwardly through the annular port 24, thus creating a suction in the nose piece 21, thereby pulling the cotton from the bolls and delivering the same to the trailer 12 by way of the connecting hose 16 and the pipe 14. It will be noted that the path of the cotton is virtually unobstructed, and that the cotton is whirling as it passes through the tubular body 18. The increased efficiency provided by the whirling action is not fully understood, but has been proven superior by actual test as compared with passage of air through tubular bodies, such as 18 and 38, without the spinning effect.

The second described form of the invention, as illustrated in Figure 3, operates in substantially the same manner as the first with the exception that the whirling action is not provided. The last referred to construction is more economical in its construction, but has the disadvantage of not being able to regulate the amount of air supplied and does not include the whirling action. In all other respects the operation is the same as described in connection with the former.

The invention is not limited to the constructions herein shown and described, but may be made in many ways with the scope of the appended claim.

What is claimed is:

A cotton picking nozzle of substantially uniform unobstructed diameter throughout the length thereof, said nozzle having a forward and a rear end, a casing around said nozzle between the ends thereof, said casing defining a chamber therein, a restricted annularly arranged port construction in said nozzle and rearwardly directed with respect thereto and communicating with said chamber, and at least one air supply port communicating with said chamber and tangentially positioned with respect thereto.

References Cited in the file of this patent

UNITED STATES PATENTS

| Number | Name | Date |
|---|---|---|
| 26,180 | Griffin | Nov. 22, 1859 |
| 28,980 | Griffin | July 3, 1860 |
| 31,596 | Griffin | Mar. 5, 1861 |
| 246,818 | Ridley | Sept. 6, 1881 |
| 608,689 | Lee | Aug. 9, 1898 |
| 901,619 | Jackson et al. | Oct. 20, 1908 |
| 979,788 | Noyes | Dec. 27, 1910 |
| 1,184,151 | Tulley | May 23, 1916 |
| 1,278,175 | LeBaron | Sept. 10, 1918 |
| 1,439,270 | Skillins | Dec. 19, 1922 |
| 1,750,541 | Preston | Mar. 11, 1930 |
| 1,971,349 | Koon | Aug. 28, 1934 |
| 2,499,693 | Stanton | Mar. 7, 1950 |
| 2,653,438 | Ramirez, Sr. | Sept. 29, 1953 |